United States Patent
Holterman et al.

(10) Patent No.: US 7,116,069 B1
(45) Date of Patent: Oct. 3, 2006

(54) RAPID CONFIGURATION SAFETY MOTOR DRIVE KIT

(75) Inventors: Randall R. Holterman, Mequon, WI (US); Phillip John Walesa, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/112,187

(22) Filed: Apr. 22, 2005

(51) Int. Cl.
*H02P 7/06* (2006.01)

(52) U.S. Cl. .................. 318/254; 318/138; 318/439; 318/700

(58) Field of Classification Search ................ 318/138, 318/254, 439, 432–434, 700–800
See application file for complete search history.

(56) References Cited

U.S. PATENT DOCUMENTS 6,746,250 B1 * 6/2004 Blutbacher .................. 439/34
6,947,281 B1 * 9/2005 Wrycraft et al. ............ 361/695

OTHER PUBLICATIONS

Siemens AG, Operating Instructions for ET200S FC, Mar. 2005, Siemens AG, 6SL3298-0CA12-0BP0, pp. 1-6, 22, 25, 26, 37, 38, 69, 75, 95, 118, 121, 233, 247, 257, 258, 260.*
Siemens AG, User Documentation for Micromaster 411 ECOFAST, Jan. 2003, Siemens AG, 6SE6400-5CC00-0BP0, pp. 1, 4, 7, 8, 9, 10, 11, 35, 36, 37, 41, 47, 56, 66, 84, 89.*
Siemens AG, User Documentation for ET200S Motor Starters (Fail Safe, safety integrated), Feb. 2005, Siemens AG, 6ES7151-1AA10-8BA0, pp. 1, 2, "1-13", "2-4", "4-8", "8-13".*

* cited by examiner

*Primary Examiner*—Lincoln Donovan
*Assistant Examiner*—Tyrone Smith
(74) *Attorney, Agent, or Firm*—Quarles & Brady, LLP; Alexander M. Gerasimow

(57) ABSTRACT

Rapid connection of multiple motor drive modules for safety operation may be made using screw terminals for initial connections to a safety controller and pre-wired cables for daisy chaining subsequent motor drives responsive to the same safety signals. Adaptor modules may be used to provide for a variety of different connector configurations depending on the location of the motor drive within the signal chain.

18 Claims, 4 Drawing Sheets

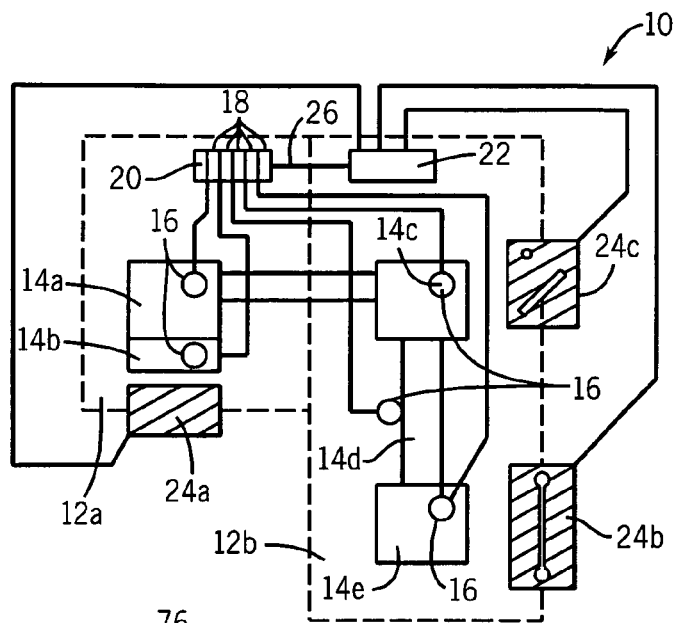
FIG. 1
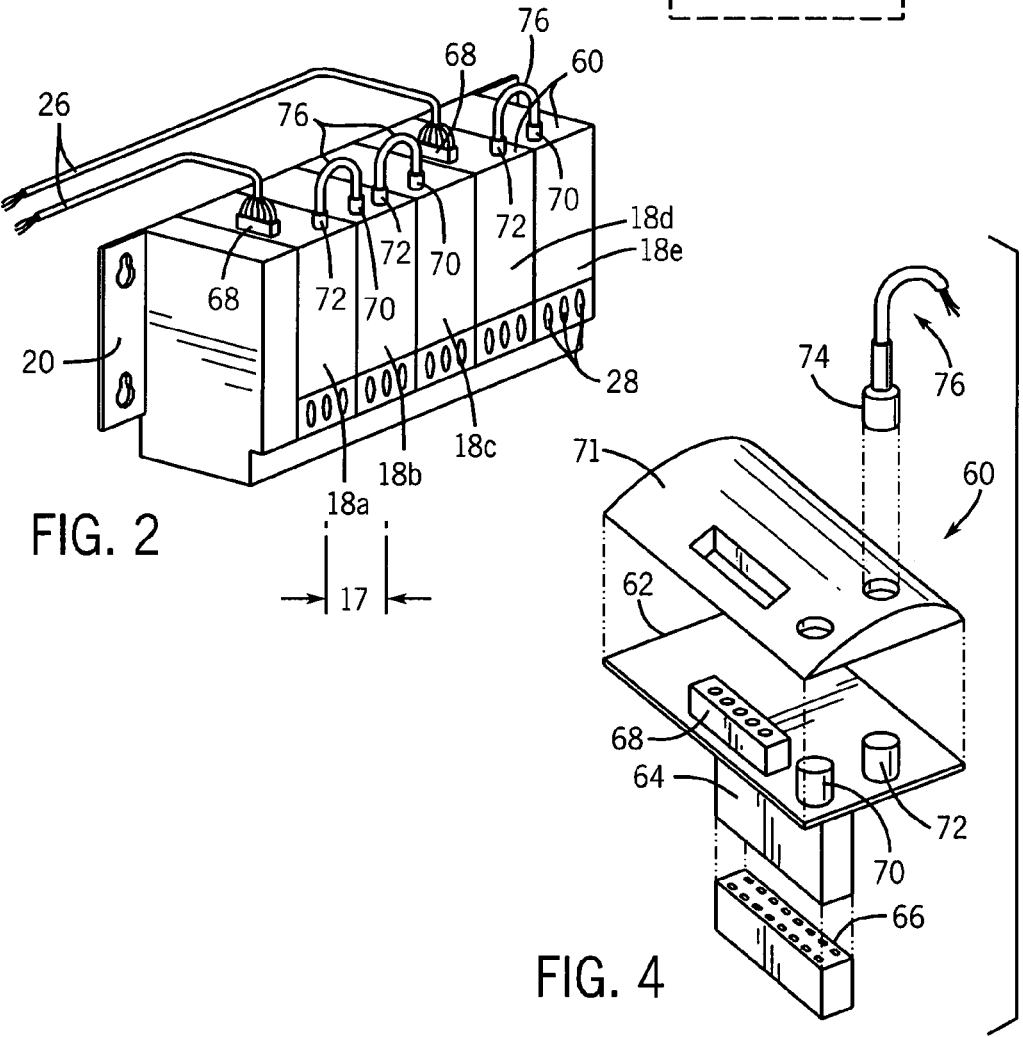
FIG. 2
FIG. 4

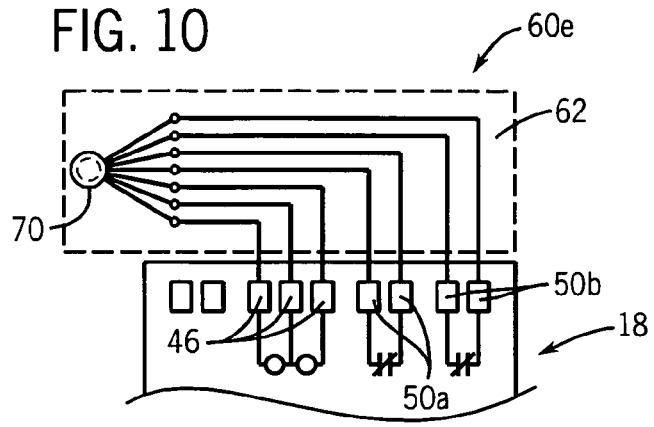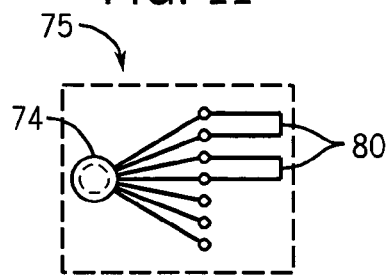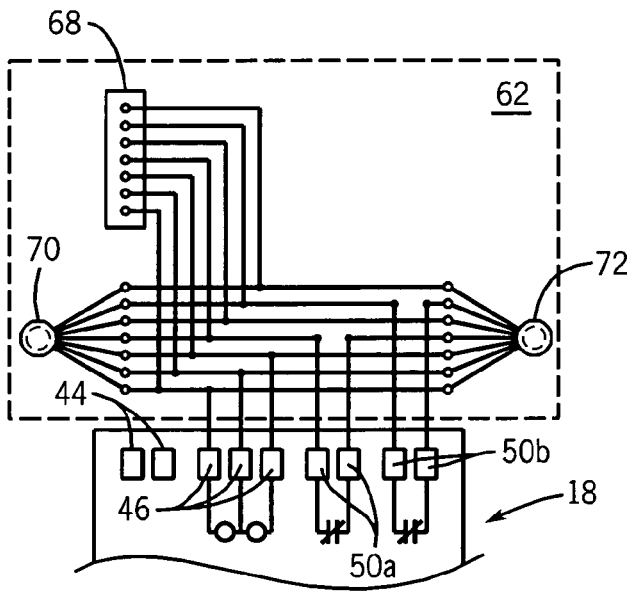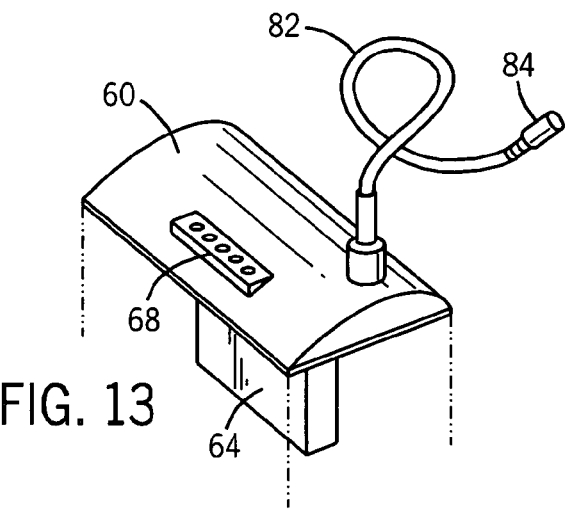

RAPID CONFIGURATION SAFETY MOTOR DRIVE KIT

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to motor drives for electrical motors and in particular to a motor drive useful in safety systems.

Motor controllers provide sophisticated control of electrical motors by changing the frequency and amplitude of the power received by those motors. The control provided by a motor drive may be simple open-loop control of the motor, for example, ramping its speed up during start or may include more complex feedback control of motor speed and position using signals from an external tachometer or position encoder. One or more motor drives may be connected to an industrial controller programmed to coordinate the actions of multiple motors in an industrial process.

Safety systems are systems intended to ensure the safety of humans working in the area of potentially dangerous machinery in an industrial process. Safety systems accept inputs from emergency stop buttons, rope pull switches, safety mats, key switches, light curtains and the like, and stop the operation of equipment based on a command or the presence of a human in a dangerous area. Typically such equipment is powered by electric motors, and safety systems may disable those motors to stop the equipment.

Traditionally safety systems have been implemented by a set of circuits wholly separate from an industrial control system that may be used to control the industrial process with which the safety system is associated. Such safety systems may use specially designed "safety relays" which require a redundant signal to actuate relay contacts and which provide feedback signals that can reveal relay failures such as welded or stuck contacts.

In order to simplify wiring and hardware when motor drives are part of a safety system, it is known to incorporate safety relay circuitry directly into the motor drive. In this way, redundant safety signals may be provided directly to the motor drive (and safety feedback signals returned) allowing safe shutdown of the motor without the need for external contactors and their associated wiring.

The safety wiring connected to the motor drive includes five or seven conductors: three for the two redundant safety signals and a combined return which drive separate relay coils, and two or four more for the feedback signals and returns for two separate contacts associated with each relay coil. Often multiple motor drives are stacked together in a small area and adding this additional wiring to each motor drive can be cumbersome. When multiple motor drives are used, the number of wires from the control device to each motor drive can exceed the limit of wires that can fit on the terminals of the control device requiring the use of additional terminals and additional wiring. Inevitably, connecting the large number of wires needed for safety control increases the possibility of miswiring and increases installation costs.

BRIEF SUMMARY OF THE INVENTION

The present invention recognizes that frequently, multiple motor drives for example, in the same rack, will operate together with respect to safety signals related to a particular zone in which the motors are located. The present invention provides a system that allows safety signals for such coordinated motor drives to be "daisy chained" among motor drives using standard pre-wired connector cables. The connector cables provide the correct wiring logic for the safety interconnections while minimizing wiring time and wiring mistakes. Interchangeable adapters on each motor drive may be used to provide the appropriate connectors for different configurations of multiple motor drives.

Specifically, the present invention provides a rapid-configuration, safety motor drive. The motor drive kit includes a motor drive having power input terminals for receiving a source of power, and motor output terminals for providing power to an electrical motor. The motor drive also has safety signal terminals for communicating safety signals, including at least two redundant enable signals and at least one contact feedback signal. Safety logic circuitry in the motor drive receives the safety signals to produce at least one motor enable signal that controls motor control circuitry connected to the power input terminals, and to the motor output terminals to control power to the electrical motor. The safety signal terminals provide at least one multiwire pluggable connector configured to communicate safety signals received by the safety motor drive to multiple safety motor drives through mating connector cables.

It is thus one object of the invention to provide rapid and error free wiring of safety signals to multiple motor drives that respond in coordinated fashion to safety signals.

The safety signal terminals further provide screw terminals for receiving the safety signals from the signal source.

Thus it is another object of the invention to provide maximum flexibility in connecting the motor drive to the original set of safety signals from a remote device.

The invention may provide a kit including multiple adapters connecting the safety signal terminals to different connector configurations including a screw terminal, a pluggable multi-wire connector for forwarding safety signals to a later safety motor drive through a pre-wired connector cable and a pluggable multi-wire connector for receiving safety signals from a previous safety motor drive through pre-wired connector cable.

It is another object of the invention to provide a system that may easily customize motor drives to provide only the connectors necessary.

One adaptor may have no external connectors and provide internal wiring for disabling the safety logic circuitry.

Thus, it is another object of the invention to provide a single platform that may provide safety or non-safety motor drives.

The pluggable connector may pass enable signals in parallel to multiple safety motor drives and feedback signals in series to multiple motor drives.

Thus, it is another object of the invention to handle the logic of the wiring multiple motor drives together automatically with prewired cables.

The adaptor may include a housing having a different color from a housing of the safety motor drive and visible to a user indicating that the motor drive is a safety motor drive.

Thus, it is an object of the invention to provide both safety and standard motor drives using similar packages that may nevertheless be readily identified by their color of the adaptor.

The kit may include a termination cable receivable by the adapter with a pluggable multi-wire connector for forwarding safety signals to a later safety motor drive to terminate a signal chain. The termination cable may provide a short circuit across safety signal terminals associated with the contact feedback signal.

Thus, it is an object of the invention to allow termination of the signal chain without a special adapter in cases where that is cost effective.

The motor drives may be containable in a rack having a pre-determined spacing and the set of cables may have standard lengths based on the rack spacing.

It is thus another objection of the invention to provide for manageable wiring when multiple motor drives are in a compact volume with a limited number of cable sizes.

The motor drives may be mounted at the back face and the safety signal terminals may be on a top face of the motor drives as mounted.

Thus, it is an object of the invention to provide a point of connection of the safety signals that does not interfere with the standard front panel connections to the motor drives and feedback connectors on the motor drive or with the rack mounting.

These particular objects and advantages may apply to only some embodiments falling within the claims and thus do not define the scope of the invention.

BRIEF DESCRIPTION OF THE DRAWINGS

FIG. 1 is a simplified plan of an industrial process having perimeter control devices connected to an industrial controller which communicates with motor drives attached to motors in different zones of the industrial process;

FIG. 2 is a perspective view of the motor drives of FIG. 1 showing the present invention's connection of multiple motor drives with prewired connectors;

FIG. 4 is an exploded perspective view of an adaptor module for providing connections to the safety signal terminals accessible at the tops of the motor drives of FIG. 2;

FIGS. 6 through 10 are schematic representations of the wiring employed by the adaptor modules of FIG. 5;

FIG. 11 is a wiring diagram of a termination cable that may be used with some adapter modules;

FIG. 12 is a schematic representation of the wiring employed by the adaptor module of FIG. 4; and FIG. 13 is a perspective view of an alternative embodiment of an adapter module in which a cable is pre-attached to the adapter unit.

DETAILED DESCRIPTION OF THE PREFERRED EMBODIMENT

Figure 3:
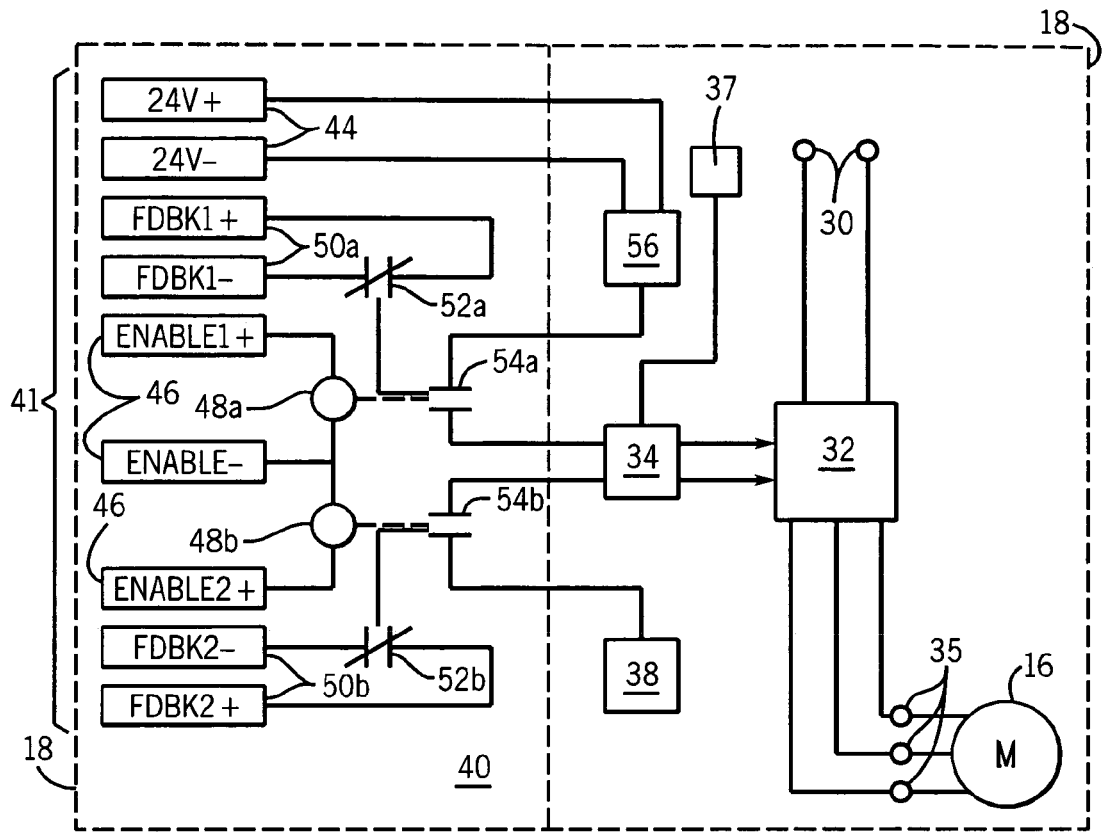
FIG. 3 is a schematic representation of a motor drive of FIG. 2 showing internal safety relay circuitry communicating with safety signal terminals.

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside the scope of the present invention including design of safety systems, installation and maintenance of the components of the safety system, and the cooperation and training of individuals using the safety system. Although the present invention is intended to be highly reliable, all physical systems are susceptible to failure and provision must be made for such failure.

Referring to FIG. 1, an example industrial process 10 suitable for application of the present invention includes a first and second zone 12a and 12b, zone 12a having motor powered equipment 14a and 14b, and zone 12b having motor powered equipment and 14c through 14e. Access to zones 12a and 12b is controlled by access control devices 24, specifically including safety mat 24a for zone 12a, and light curtain 24b and trapped key door latch 24c for zone 12b.

The equipment 14a through 14e may include one or more motors 16 controlled by respective motor drives 18, the motor drives 18 communicating with an industrial controller 22. Each of the access control devices 24 also communicates with an industrial controller 22 so that the industrial controller 22 can provide safety signals through cables 26 to control motor drives 18 in response to signals from the access control devices 24. Alternatively, but not shown, the cables 26 may proceed directly from the access control devices 24 to the motor drives 18 from the access control devices 24 through one or more safety relays (not shown) to the motor drives 18.

Referring now to FIG. 2, motor drives 18a–18e may fit side by side in a rack 20 with rear faces of the motor drives 18a–18e attached to a power rail (not shown) providing for DC and logic power to each of the motor drives 18a–18e as well as other control signals. A front face of each motor drive 18a–18e includes various connectors 28 for connecting to motors, encoders, tachometers and the like as is understood in the art. The motor drives 18 may, for example, be safety enabled, servo motor drives such as the Kinetix 6000 commercially available from Rockwell Automation, Inc., the assignee of the present invention.

Referring now also to FIG. 3, the motor drives 18 include power input terminals 30 at their rear faces attached to the power rails of the rack 20 to receive DC power. This DC power is developed by rectifying three phase power that is brought to a rack mounted power supply. This DC power is provided to power semi-conductors in motor drive electronics 32 which synthesizes new three phase power with controlled phase and amplitude connected to motor output terminals 35 through connectors 28 to a motor 16.

The phase and amplitude of the power at motor output terminals, produced by the motor drive electronics 32, is controlled by gate control circuitry 34 providing gate signals to the semiconductors as is understood in the art. The gate control circuitry 34 may receive control signals 37, for example, from tachometers and encoders attached to connectors 28, and from the industrial controller 22 as is understood in the art. External signals may also provide a gate control enable signal 38 that will control activation of the gate control circuitry 34 as will be described below.

Referring still to FIG. 3, safety circuitry 40 is also provided within each motor drive. The safety circuitry 40 processes and provides safety signals 41. The safety signals 41 include a 24 volt and 24 volt power signals provided by terminals 44 connected to internal power source 56. The safety signals 41 also include two enable inputs, ENABLE1+ and ENABLE2+ and a common return, ENABLE– at terminals 46 which together allow power to be provided to either of two safety relay coils 48a and 48b. The safety signals 41 also include feedback signals FDBK1+ and FDBK1– at terminals 50 connected across normally closed contacts 52*a* and FDBK2+ and FDBK2− at terminals 50*b* connected across normally closed contacts 52*b*.

Per conventional safety relay design, normally closed contact 52*a* is mechanically linked to normally open contact 54*a* so that contact 52*a* must be open when contact 54*a* is closed and vice versa. Thus, contact 52*a* may detect whether contact 54*a* has been welded closed creating a potential loss of control. Likewise, normally closed contact 52*b* is inflexibly linked to normally open contact 54*b*.

Contact 54*a* is controlled by coil 48*a*, and contact 54*b* is controlled by coil 48*b*. The former contact 54*a* controls the application of power from power source 56 to the gate control circuitry 34, and the latter contact 54*b* controlling the connection of the gate control enable signal 38 to the gate control circuitry 34. Both contacts 54*a* and 54*b* must be closed before the gate control circuitry 34 is activated to allow PWM (Pulse Width Modulated) signals to proceed to the motor 16. Thus the two enable signals ENABLE1+ and ENABLE2+ provide redundant signal paths and must both be activated to enable the motor drive 18. When the two enable signals ENABLE1+ and ENABLE2+ do not have the same state, an error may be detected per standard safety protocols and communicated to the industrial controller 22. An error may also be detected if the feedback signals FDBK1+ and FDBK2+ indicate welded contacts by remaining open when the corresponding enable signals ENABLE1+ or ENABLE2+ are not present.

Referring now to FIGS. 2 and 4, safety signals 41 may be communicated among motor drives 18 by means of adaptor modules 60 and prewired cables 76. Each adapter module 60 includes a circuit card 62 having a downwardly extending electrical connector 64 connecting with a corresponding connector 66 providing safety signals 41 from terminals 44, 46, and 50*a* and 50*b*. The electrical connector 64 communicates via traces (not shown) on a circuit card 62, to one or more user accessible connectors, including, for example, screw terminal connector 68 and mechanically identical upstream and downstream pluggable connectors 70 and 72. Collectively, connectors 68, 70 and 72 provide safety signal terminals 42. The terms "downstream" and "upstream" are arbitrary and reflect a general flow of safety signals from right to left as depicted in the figures. Screw terminal connector 68 may receive seven individual wires held by screws, while pluggable connectors 70 and 72 provide seven pins (or sockets) that may mate with corresponding plugs 74 of a standard pre-wired cable 76 as will be described below. Each connector 68, 70 and 72, if present, is exposed on an upper surface of the circuit card 62 through a colored plastic escutcheon 71. The adapter modules 60 are positioned at the top of each motor drive 18 so that the wiring to the adaptor modules 60 is removed from the wiring of connectors 28.

Each cable 76 connects to either the upstream pluggable connector 70 or to a downstream pluggable connector 72 on the adapter module 60 depending on the direction of the connection remaining end of the cable 76. For, example, the connection of safety signals 41 from motor drive 18*a* to motor drive 18*b* will use a cable 76 connected to a downstream pluggable connector 72 on the adapter module 60 of motor drive 18*a* and connected to an upstream pluggable connector 70 on the adapter module of motor drive 18*b*.

Referring again to FIG. 1, the wiring of safety signals 41 from the industrial controller 22 or other control source to multiple motor drives 18 that will operate in a single zone 12 (and are thus responsive to a common set of safety signals 41) may proceed by taking cables 26 from the control source and connecting it on a conductor-by-conductor basis to screw terminals of screw terminal connector 68 of the adapter module 60 of motor drives 18*a* and 18*d*, each being motor drives associated with motors 16 in different zones 12*a* and 12*b*. Safety signals 41 from motor drive 18*a* are then connected through pre-wired cable 76 to motor drive 18*b* and safety signals 41 from motor drive 18*b* are connected through pre-wired cable 76 to motor drive 18*c*. Likewise, safety signals 41 from motor drive 18*d* are connected through pre-wired cable 76 to motor drive 18*d*. The need for multiple wires to be installed in a single screw terminal and for the laborious hand wiring of screw terminals is thus significantly reduced for inter motor drive connections. The cables 76 may come in standard lengths keyed to multiples of standard spacing 17 between the motor drives 18.

Figure 5:
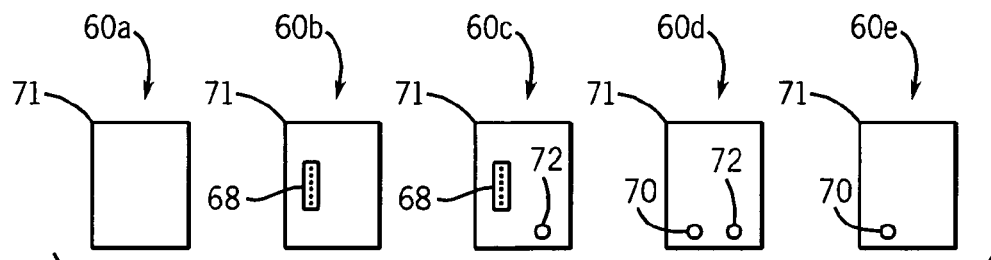
FIG. 5 is a figure showing variations in the adaptor module of FIG. 4 suitable for different positions of the motor drive within a chain of motor drives.

Referring now to FIG. 5, connections of motor drives can be simplified and cost reduced by providing only some of connector 68, 70, and 72 on a given adapter module 60 depending on the particular use to which the motor drive 18 will be placed.

Figure 6:
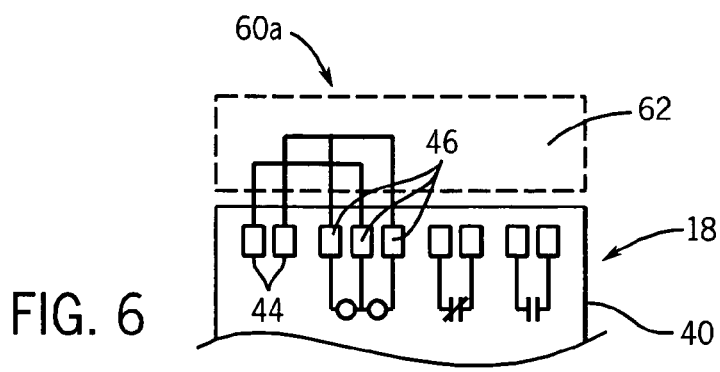

A simplest embodiment of the adapter module 60 has none of the connectors 68, 70 and 72, and is used when the safety relay portions of the motor drive are not required. Referring to FIG. 6, for this adapter plate, circuit card 62 contains traces that connect power terminals 44 directly to the ENABLE1+ and ENABLE2+ terminals 46 (and their return ENABLE−) to continuously activate coils 48*a* and 48*b* (shown in FIG. 3). The escutcheon 71 in this case includes no openings for any connectors.

Figure 7:
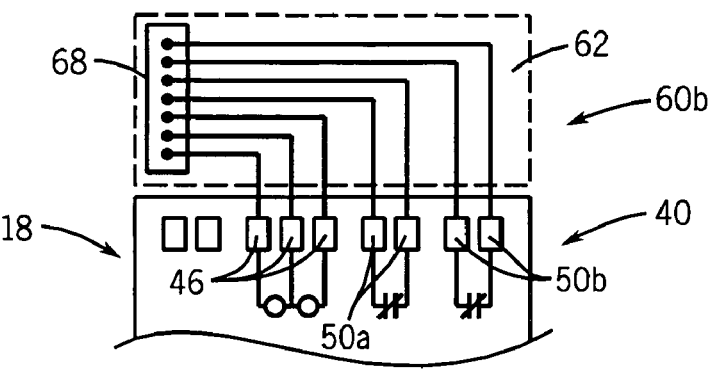

Referring to FIGS. 5 and 7, when a motor drive 18 is to be used in a stand-alone configuration or as the sole motor drive 18 for a safety zone, only screw terminal connector 68 is required and thus the escutcheon 71 provides for an opening for this single connector. Each of the seven screw terminals of the screw terminal connector 68 connects to a corresponding one of the seven terminals 46, 50*a* and 50*b* so as to simply communicate the safety signals 41 at these terminals to the screw terminal of screw terminal connector 68.

Preferably the escutcheon 71 for adapter module 60*b* (and the later adapter to be described) will be colored a standard color, for example red to indicate that the motor drive 18 is a safety enabled motor drive in contrast to the color of the escutcheon 71 of adapter module 60*a* which may be a muted color of the housing of the motor drive 18 to clearly indicate that it is not safety enabled.

Figure 8:
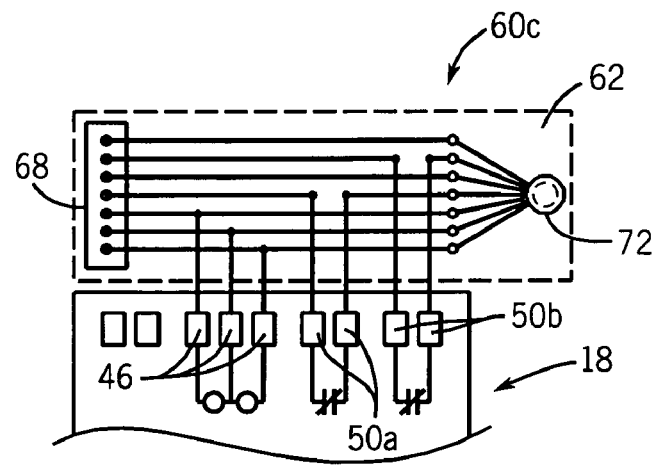

Referring now to FIGS. 5 and 8, when a motor drive 18 is the first in a chain of motor drives for same zone 12, for example, motor drive 18*a* and 18*d* of FIG. 2, the adapter module 60*c* provides both screw terminal connector 68 and downstream pluggable connector 72 exposed through the escutcheon 71. In this case, three terminals of connectors 68 and 72 (e.g., terminal 5, 6, and 7) are wired in parallel to each other and terminals 46 so that each of the three terminals of screw terminal connector 68 connects to one of terminal 46, and to one terminal of connector 72. Terminals 50*a* are wired in series between two corresponding terminals of connector 68 and 72 (terminals 4) and terminals 50*b* are wired between two different corresponding terminals of connector 68 and 72 (terminals 2). The remaining two terminals (1 and 3) of each of these connectors 68 and 72 are joined by conductors not communicating directly with terminals 46, 50*a* and 50*b*. These connections allow terminals 50*a* and 50*b* of successive motor drives 18 to be wired in series in a single loop facilitating the detection of contacts welds. This adapter module 60 would be suitable for motor drives 18*a* and 18*d* of FIG. 2.

Figure 9:
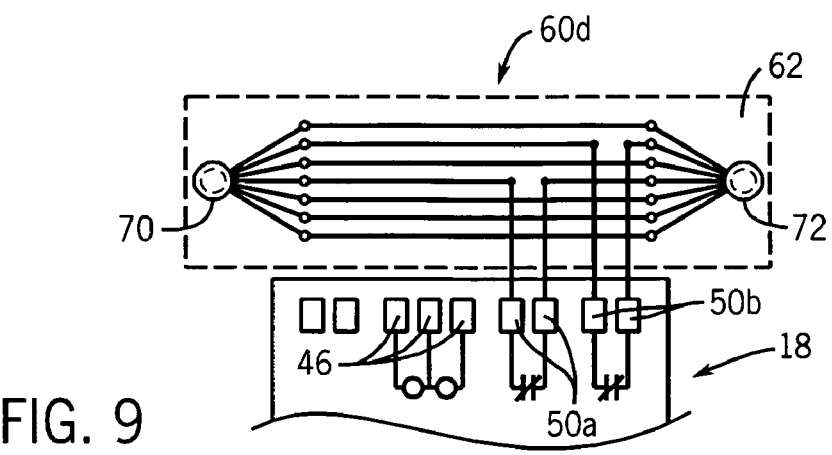

Referring to FIGS. 5 and 9, an adapter module 60d may also be provided having only connectors 70 and 72 for motor drive 18 that is neither the first nor the last in a set of motor drives 18 operating in tandem in a given zone, for example, per motor drive 18b of FIG. 2. As shown in FIG. 9, connectors 70 and 72 are wired to the seven terminals 46, 50a and 50b in a manner essentially analogous to that as shown in FIG. 8 with connector 68 replaced by connector 70.

Referring to FIGS. 5 and 10, adapter module 60e provides only connector 70 for use by a final motor drive 18 in a daisy-chain of motor drives 18 operating according to a single set of safety signals 41, for example, per motor drive 18c and 18e of FIG. 2. The wiring shown in FIG. 10 is analogous to that described above with respect to FIG. 7 with screw terminal connector 68 replaced with upstream pluggable connector 70. Note that this wiring provides closure of the series loop passing through each of the terminals 50a and 50b of the motor drives by connecting terminals 1 and 2 and terminals 3 and 4 of connector 70 through normally closed relay contacts.

Referring to FIGS. 11 and 5, the adapter module 60d may serve also for the purpose fulfilled by adapter module 60e through the use of a special termination cable 75 shown in FIG. 11 having plugs 74 with the first and second and third and fourth pins shorted. These short circuits provide for a return path for the feedback relays and essentially serve to turn the wiring diagram of FIG. 9 into the wiring diagram of FIG. 10.

Referring to FIGS. 12 and 4, it will be understood that the adapter having all of these connectors 68, 70 and 72 may also be used in which case it need not be removed from the motor drive 18, but may be permanently affixed by attaching circuit card 62 directly to connector 66 without the need for connector 64. In this case as shown in FIG. 12, connector 68 is simply wired in series with connector 70 and in all other respects, the connections are identical to those described with respect to FIG. 9.

Referring now to FIG. 13, in an alternative embodiment, either or both of connectors 70 and 72 may be replaced with cables 82 having connectors 84 equivalent to connectors 70 and 72 on the ends of those cables 82 so as to eliminate one connector in forming the necessary junctions.

The cables 76 may be mass-produced using automated termination equipment and eliminate the possibility of cross-wiring in the connection of the various motor drives 18.

It is specifically intended that the present invention not be limited to the embodiments and illustrations contained herein, but include modified forms of those embodiments.

We claim:

1. A rapid-configuration safety motor drive comprising:
power input terminals of receiving a source of power;
motor output terminals for providing power to an electrical motor;
safety signal terminals for communicating dedicated safety signals including at least two redundant enable signals and at least one contact feedback signal;
safety logic circuit for receiving the dedicated safety signals to produce at least one motor enable signal;
motor control circuitry connecting the power input terminals to the motor output terminals to control the power to the electrical motor according to the motor enable signal; and
wherein the safety signal terminals provide at least one multiwire pluggable connector configured to communicate dedicated safety signals received by the safety motor drive to multiple safety motor drives through mating connector cable different safety signals being communicated on different individual conductors of the multiwire pluggable connector.

2. The rapid-configuration safety motor drive of claim 1 wherein the safety signal terminals further provide screw terminals for receiving the dedicated safety signals from the signal source.

3. The rapid-configuration safety motor drive of claim 1 wherein the safety signal terminals further provide a second multiwire pluggable connector for receiving dedicated safety signals from a previous safety motor drive.

4. The rapid-configuration safety motor drive of claim 1 wherein the pluggable connector passes the enable signals in parallel to multiple safety motor drives and feedback signals in series to multiple motor drives.

5. The rapid-configuration safety motor drive of claim 1 wherein the multiwire pluggable connector is exposed at a housing of the motor drive.

6. The rapid-configuration safety motor drive of claim 1 wherein the multiwire pluggable connector includes a cable affixed to the motor drive and having the pluggable connector on one end.

7. The rapid-configuration safety motor drive of claim 1 wherein the motor drive is mountable at a back face and wherein the safety signal terminals are on a top face of the motor drive as mounted.

8. A rapid-configuration safety motor drive kit comprising:
a motor drive having:
(a) power input terminals for receiving a source of power;
(b) motor output terminals for providing power to an electrical motor;
(c) safety signal terminals for communicating dedicated safety signals including at least two redundant enable signals and at least one contact feedback signal;
(d) safety logic circuit for receiving the dedicated safety signals to produce at least one motor enable signal;
(e) motor control circuitry connecting the power input terminals to the motor output terminals to control the power to the electrical motor according to the motor enable signal;
wherein the safety signal terminals include a first pluggable connector communicating from the safety logic circuitry to an adapter, different safety signals being communicated on different individual conductors of the first multiwire pluggable connector; and
a set of adapters selected from the group consisting of:
(a) an adapter with screw terminals for receiving the dedicated safety signals directly from a safety controller;
(b) an adapter with a pluggable multiwire connector for forwarding dedicated safety signals to a later safety motor drive through a prewired mating connector cable; and
(c) an adapter with a pluggable multiwire connector for receiving dedicated safety signals from a previous safety motor drive through a prewired mating connector cable.

9. The safety motor drive kit of claim 8 further including an adapter having no external connector other than the first pluggable connector, the adapter providing internal wiring disabling the safety logic circuit;
wherein internal wiring connects power from the safety signal terminals back to terminals of the motor enable signal.

10. The safety motor drive kit of claim 8 further including an adapter with screw terminals for receiving the dedicated safety signals directly from a safety controller and with a pluggable multiwire connector for forwarding dedicated safety signals to a later safety motor drive through a prewired mating connector cable; and an adapter with screw terminals for receiving the dedicated safety signals directly from a safety controller and no other external connector other than the first pluggable connector.

11. The safety motor drive kit of claim 8 further including an adapter with screw terminals for receiving the dedicated safety signals directly from a safety controller and a pluggable multiwire connector for forwarding dedicated safety signals to a later safety motor drive through a prewired mating connector cable; and an adapter with pluggable multiwire connectors for receiving the dedicated safety signals from a previous safety motor drive through a prewired mating connector cable and a pluggable multiwire connector for forwarding dedicated safety signals to a later safety motor drive through a prewired mating connector cable.

12. The safety motor drive kit of claim 8:

further including an adapter with a pluggable multiwire connector for receiving the dedicated safety signals from a previous safety motor drive through a prewired mating connector cable and a pluggable multiwire connector for forwarding dedicated safety signals to a later safety motor drive through a prewired mating connector cable; and an adapter with a pluggable multiwire connector for receiving the dedicated safety signals from a previous safety motor drive through a prewired mating connector cable having no other external connector other than the first pluggable connector, the adapter providing internal wiring disabling the safety logic circuit.

13. The safety motor drive kit of claim 8 wherein the pluggable connector passes the enable signals in parallel to multiple safety motor drives and feedback signals in series to multiple motor drives.

14. The safety motor drive kit of claim 8 wherein the adapter includes a housing having a color different from a color of a housing of the safety motor drive and visible to a user indicating that the motor drive is a safety motor drive.

15. The safety motor drive kit of claim 8 including a termination cable receivable by the adapter with a pluggable multiwire connector for forwarding dedicated safety signals to a later safety motor drive to terminate a signal chain.

16. The safety motor drive kit of claim 8 wherein the adapter provides a short circuit across safety signal terminals associated with the contact feedback signal.

17. The safety motor drive kit of claim 8 wherein the motor drive is containable in a rack having a rack spacing and further including a set of cables having standard lengths based on the rack spacing.

18. The safety motor drive kit of claim 8 wherein the motor drive is mountable at a back face and wherein the safety signal terminals are on a top face of the motor drive as mounted.

* * * * *